E. A. KEELER.
OPTICAL PYROMETRY.
APPLICATION FILED OCT. 30, 1919.

1,379,188.

Patented May 24, 1921.

INVENTOR
Earl A. Keeler
BY
Cornelius D. Ehret
his ATTORNEY

UNITED STATES PATENT OFFICE.

EARL A. KEELER, OF NORRISTOWN, PENNSYLVANIA, ASSIGNOR TO LEEDS & NORTHRUP COMPANY, OF PHILADELPHIA, PENNSYLVANIA, A CORPORATION OF PENNSYLVANIA.

OPTICAL PYROMETRY.

1,379,188.

Specification of Letters Patent.    Patented May 24, 1921.

Application filed October 30, 1919. Serial No. 334,496.

*To all whom it may concern:*

Be it known that I, EARL A. KEELER, a citizen of the United States, residing in Norristown, county of Montgomery, State of Pennsylvania, have invented certain new and useful Improvements in Optical Pyrometry, of which the following is a specification.

My invention relates to optical pyrometry wherein an electric current passed through an incandescible body, as an incandescent electric lamp, serving as a light standard, is varied until the brightness of the standard matches the brightness of the incandescent body whose temperature is to be measured, the temperature being then determined from the reading of a galvanometer whose deflection is dependent upon the amount of current traversing the lamp filament.

Where deflecting galvanometers, as of the D'Arsonval type, are employed the lower part of the deflection range of the instrument is useless because the pyrometer is useless for all temperatures below that corresponding with dull red of the lamp filament, because a considerable current is required to bring the lamp filament to dull red, and that current causes substantial deflection of the instrument.

It is the object of my invention to provide a method of and apparatus for optical pyrometry wherein the zero of the instrument is suppressed electrically in such way that the lowest part of the range of deflection of the instrument becomes available, whereby the scale of the instrument is lengthened in the sense that it is completely utilized, the lowest temperature reading corresponding with the true zero of the galvanometer.

My invention resides in the method and apparatus hereinafter described and claimed.

For an illustration of some of the modes for practising my method and of some of the forms my apparatus may take, reference is to be had to the accompanying drawing, in which.

Figure 1:
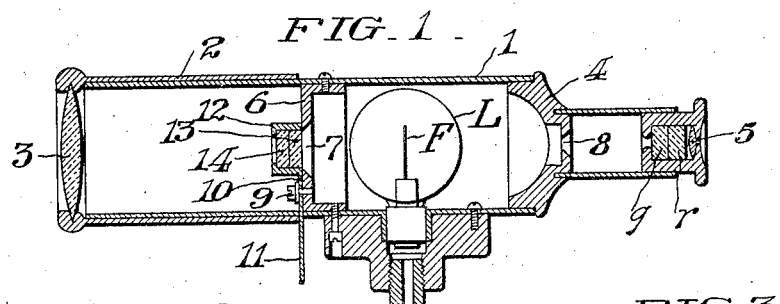
Figure 1 is a cross sectional view of pyrometric apparatus.
Figure 2:
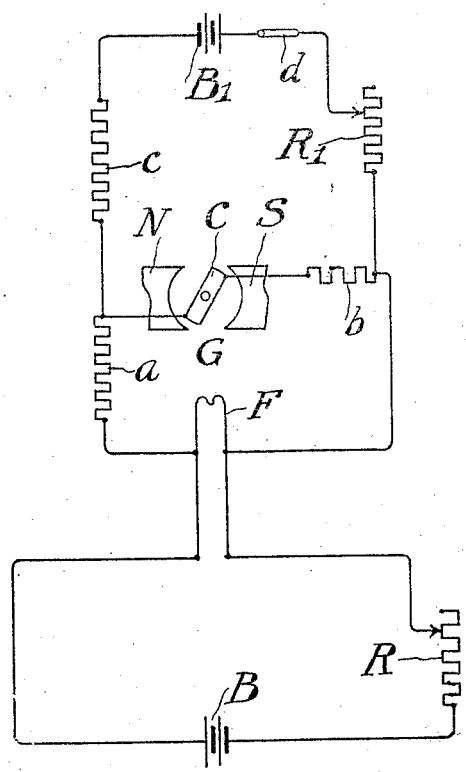
Fig. 2 is a diagrammatic view showing my preferred circuit arrangements.

Referring to Figs. 1 and 2, 1 is a tube upon which is slidable, the tube 2 having at its front end the objective lens 3. The tube 1 is closed at its rear end by the member 4 supporting the eye piece structure having the ocular lens 5 in front of which may be disposed glass screens, as $r$ and $g$, of any suitable colors, as for example, red or green. Suitably disposed within the tube 1 is the incandescent lamp L having the filament F. Between the lamp L and the objective 3 may be disposed the member or diaphragm 6 having the aperture 7 in the optical axis of the instrument. The aperture 8 is also in the axis of the eye piece structure, and the objective 3. Upon the member 6 is pivoted at 9 the lever 10 having a handle 11 extending to the exterior of the telescope structure. At its inner end the lever 10 carries the holder 12 in which may be disposed absorption screen elements of any suitable character, as 13 and 14.

With apparatus of the character described in connection with Fig. 1 may be employed electrical apparatus of the character illustrated in Fig. 2.

In Fig. 2 the lamp filament F is connected in series with the battery or source of current B and the variable resistance or rheostat R.

When the filament F is of tungsten or other positive temperature coefficient, it is preferred that the galvanometer be employed in a circuit in shunt thereto in a voltmeter relation. In Fig. 2 N and S indicate the north and south poles, respectively, of a permanent magnet system of a D'Arsonval galvanometer whose pivoted coil C is connected in series in a circuit in shunt to the filament F. Suitable resistances, as $a$ and $b$, preferably of zero or negligible temperature coefficient, may be connected in series in said circuit with the coil C.

As thus far described, the apparatus is operable as follows:

The telescope instrument of Fig. 1 is pointed at the body whose temperature is to be measured. Unless the body is incandescent, that is, at least at a dull red temperature, the optical pyrometric apparatus would be unsuitable. The body being therefore an incandescent one, the rheostat R is adjusted until current of such magnitude passes through the filament F that it attains the same brightness as the incandescent body, balance in brightness being determined by placing the eye at the eye piece 5 and adjusting the rheostat R until a match is attained. When obtained the galvanometer pointer deflects to a position somewhere to the right of the index mark 15 on the instrument scale 16, Fig. 4. The index mark 15 corresponds with the deflection of the galvanometer for the lowest temperature, as 1200 degrees F., at which the optical instrument is employed. In accordance with prior practice the entire lower range of the instrument, as 1200 to 2500 degrees F., lies between the index mark 15 and the right end of the scale 16. In other words, the pointer of the galvanometer deflects from the true zero index 17 to the point 15 before the lamp filament attains suitable temperature to be utilizable in optical pyrometry, the index 17 corresponding with the position of the galvanometer needle when zero current flows through its coil.

By my invention, however, I am enabled to utilize the entire length of the scale 16 by utilizing not only that portion heretofore utilizable, but also that part lying between the indices 17 and 15, and so in effect lengthening the scale or suppressing the zero whereby the lowest temperature, as for example 1200 degrees, corresponds with the true zero of the instrument.

This is accomplished by connecting in shunt to the galvanometer coil C or in shunt to it and any suitable resistance in circuit therewith, as for example, its usual resistance $b$, a zero suppressing or auxiliary shunt circuit, controlled by switch $a$, including the source of current or battery $B^1$, so connected as to oppose battery B in its effect upon the galvanometer coil, the adjustable resistance or rheostat $R^1$ and an additional resistance, as $c$. The resistances $R^1$ and $c$ preferably have zero or negligible temperature coefficients.

With a given galvanometer G and lamp filament F the index mark 15 is determined by sighting the instrument upon any incandescent body at a known temperature, as for example, 1200 degrees F. The rheostat R is then adjusted until such current flows through the filament F as to induce a brightness matching the brightness of the body at the known temperature. The deflection of the galvanometer is then noted and the index mark 15 placed upon the scale 16 directly opposite the instrument needle or pointer. The index 15 therefore corresponds with 1200 degrees or any other predetermined or suitable known temperature constituting the minimum temperature for which the apparatus is to be utilized.

The switch $d$ is then closed and the resistance $R^1$ so adjusted that, with the same adjustment of the rheostat R and the same current through the filament F as before, the current through the galvanometer coil C is reduced to zero, because of the effect of the shunt circuit including the source $B^1$ now equal and opposite to the effect produced upon the galvanometer circuit by the difference of potential across the terminals of the filament F. The galvanometer needle will now point at the index 17, the true zero of the instrument. With no current flowing through the coil C the filament F is at a temperature of 1200 degrees and in effect the zero of the instrument has been suppressed in such manner that the temperature at the beginning of the useful range of the apparatus is now indicated when the galvanometer needle points at its true zero, 17. With such setting of the resistance $R^1$ the scale 16 may now be calibrated by matching the filament F with different adjustments of the rheostat R upon an incandescent body at different known temperatures, whereby the scale range, as from 1200 to 2500 degrees, will now occupy the entire length of the scale 16 from the index 17 to the extreme right.

This in effect lengthens the scale, makes it more easily readable, and all errors, at least for the range below 1200 degrees, as temperature, magnetic and mechanical errors, and additive errors, are eliminated, particularly since at the beginning of the useful range of the instrument no current is flowing through it; and for errors for temperature readings above 1200 degrees F. there is partial compensation.

From time to time the instrument may be checked by opening the switch $d$ and adjusting the rheostat R until the filament F matches in brightness an incandescent body at known temperature, as 1200 degrees. If the galvanometer needle then points at the index 15, it is known that the instrument is still in perfect calibration.

The auxiliary or zero suppressing or offsetting circuit preferably has a resistance which is high as compared with the resistance of the galvanometer circuit, whereby variations of resistance of the auxiliary circuit or a variation of voltage of its battery $B^1$ shall not materially affect the ratio of the current in the galvanometer circuit to the current in the auxiliary circuit.

While the galvanometer G of Fig. 2 is employed as a voltmeter in the sense that the deflection of the coil C depends upon the difference of potential between the terminals of the filament F, it may also be employed in the relation of an ammeter.

Figure 3:
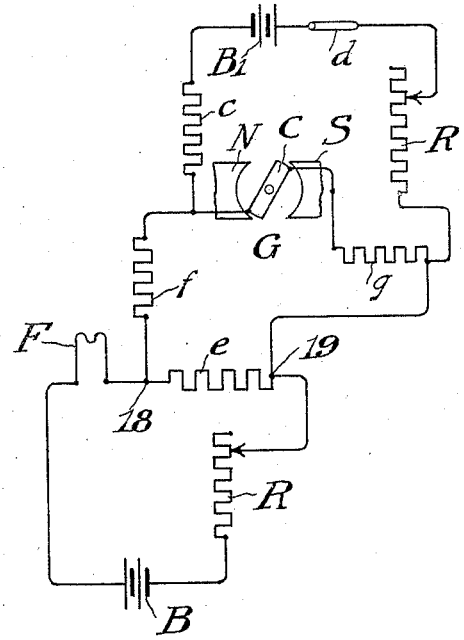
Fig. 3 is a diagrammatic view illustrating modified circuit arrangements.

In Fig. 3 the galvanometer G is employed in the ammeter relation, the terminals of the ammeter being at 18 and 19, the terminals of a resistance $e$ which is part of the ammeter instrument, and preferably of zero or negligible temperature coefficient. When the ammeter instrument is connected in series with the filament F, the resistance $e$ is brought into series with the filament, rheostat R and battery B. In shunt to the resistance and within the instrument is a circuit including the galvanometer coil C and the resistances $f$ and $g$, preferably of zero or negligible temperature coefficients. In shunt to the coil C and resistance $g$ may be applied the auxiliary or zero suppressing circuit as in Fig. 2.

Figure 4:
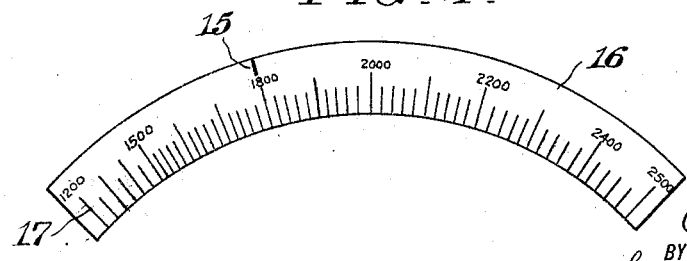
Fig. 4 is an illustration of a scale made available by my invention.

With the ammeter arrangement of Fig. 3 the useful range of the instrument, when the zero suppressing circuit is absent, is even shorter than indicated in Fig. 4 for the voltmeter relation. However, a scale similar to that in Fig. 4 with an index mark, as 15, is employed and the zero is suppressed to the true zero of the instrument by closing the switch $d$ and adjusting the rheostat $R^1$ as above described.

If the instrument is to have a double range, that is, a second range for temperatures of say, 2200 degrees and upwardly, the handle 11 is shifted to bring the absorption screens 13, 14 into the optical axis of the apparatus shown in Fig. 1, and a second series of graduations will then be made upon the scale 16.

My invention will be understood to be applicable to lamp filaments of positive temperature coefficient, as of tungsten, etc., and also to filaments of negative temperature coefficient, as of carbon.

What I claim is:

1. The method of measuring temperature, which consists in passing current through an incandescent body, varying said current to bring said body to a predetermined temperature, subjecting a galvanometer to the effects of said current to produce a deflection, reducing the potential difference impressed upon said galvanometer while maintaining said current, and thereafter varying the current through said body to bring it to a brightness to match the brightness of the body whose temperature is to be measured, and determining the temperature from the resultant deflection of the galvanometer.

2. The method of measuring temperature, which consists in passing current through an incandescent body, varying said current to bring said body to a predetermined temperature, subjecting a galvanometer to the effects of said current to produce a deflection, reducing the deflection of said galvanometer by impressing thereon an opposing electro-motive-force, and thereafter varying the current through said body to bring it to a brightness to match the brightness of the body whose temperature is to be measured, and determining the temperature from the resultant deflection of the galvanometer.

3. The method of measuring temperature, which consists in passing current through an incandescent body, varying said current to bring said body to a predetermined temperature, subjecting a galvanometer to the effects of said current to produce a deflection, reducing the deflection of the galvanometer to zero by impressing thereon an opposing electro-motive-force, thereafter varying the current through said body to bring it to a brightness to match the brightness of the body whose temperature is to be measured, and determining the temperature from the resultant deflection of the galvanometer.

4. The method of suppressing the zero of a deflecting galvanometer coöperating with an electrically incandesced light standard in optical pyrometry, which consists in opposing an electro-motive-force to the electro-motive-force impressed upon said galvanometer by the current traversing said light standard.

5. The method of suppressing the zero of a deflecting galvanometer coöperating with an electrically incandesced light standard in optical pyrometry, which consists in opposing to the electro-motive-force impressed upon said galvanometer by the current traversing said body at a predetermined temperature of incandescence an equal and opposite electro-motive-force, whereby the deflection of said galvanometer is zero for said predetermined temperature.

6. The method of producing a scale for a galvanometer coöperating with an electrically incandesced body in optical pyrometry, which consists in opposing to the electro-motive-force impressed upon said galvanometer by the current traversing said light standard at a predetermined temperature of incandescence an equal and opposite electro-motive-force, whereby the deflection of said galvanometer is zero for said predetermined temperature, thereafter bringing said incandesced light standard to higher predetermined temperatures, and marking said scale in correspondence with the deflections of said galvanometer corresponding with said temperatures.

7. Optical pyrometric apparatus comprising an incandescent body, a source of current therefor, means for varying the strength of the current through said body, a galvanometer whose deflection depends upon the strength of the current through said body, and an auxiliary circuit for changing the deflection of the galvanometer.

8. Optical pyrometric apparatus comprising an incandescent body, a source of current therefor, means for varying the strength of the current through said body, a galvanometer whose deflection depends upon the strength of the current through said body, and a zero suppressing shunt circuit comprising a variable resistance and a source of current connected in opposition to said first named source.

9. Optical pyrometric apparatus comprising an incandescent body, a source of current therefor, means for varying the strength of the current through said body, a galvanometer whose deflection depends upon the strength of the current through said body, an auxiliary circuit for changing the deflection of the galvanometer, and a scale for said galvanometer calibrated in temperature units and having for zero deflection a reading corresponding with a temperature of visible incandescence.

10. Optical pyrometric apparatus comprising an incandescent body, a source of current therefor, means for varying the strength of the current through said body, a galvanometer whose deflection depends upon the strength of the current through said body, a zero suppressing shunt circuit comprising a resistance and a source of current connected in opposition to said first named source, and a scale for said galvanometer calibrated in temperature units and having for zero deflection of said galvanometer a reading corresponding with a temperature of visible incandescence.

11. Optical pyrometric apparatus comprising an incandescent body, a source of current therefor, means for varying the strength of the current through said body, a galvanometer in a shunt to said body, and an auxiliary circuit comprising a source of current and a variable resistance for changing the deflection of the galvanometer.

12. Optical pyrometric apparatus comprising an incandescent body, a source of current therefor, means for varying the strength of the current through said body, a galvanometer in a shunt to said body, and a zero suppressing circuit in a shunt relation with respect to said galvanometer comprising a variable resistance and a source of current connected in opposition to said first named source.

13. Optical pyrometric apparatus comprising an incandescent body, a source of current therefor, means for varying the strength of the current through said body, a galvanometer in a shunt to said body, an auxiliary circuit comprising a source of current and a resistance for changing the deflection of the galvanometer, and a scale for said galvanometer calibrated in temperature units and having for zero deflection of said galvanometer a reading corresponding with a temperature of visible incandescence.

14. Optical pyrometric apparatus comprising an incandescent body, a source of current therefor, means for varying the strength of the current through said body, a galvanometer in a shunt to said body, a zero suppressing circuit in a shunt relation with said galvanometer comprising a variable resistance and a source of current connected in opposition to said first named source, and a scale for said galvometer calibrated in temperature units and having a zero deflection of said galvanometer a reading corresponding with a temperature of visible incandescence.

15. Optical pyrometric apparatus comprising a standard lamp having an incandescing filament, a source of current and variable resistance in circuit with said filament, a galvanometer whose deflection depends upon the strength of current through said filament, and an auxiliary circuit comprising a resistance and a source of current connected in opposition to said first named source of current.

16. Optical pyrometric apparatus comprising a standard lamp having an incandescing filament of positive temperature coefficient, a source of current and variable resistance in circuit therewith, a galvanometer connected in a shunt to said filament, a circuit connected in a shunt relation with said galvanometer comprising a resistance and source of current connected in opposition to said first named source.

17. Optical pyrometric apparatus comprising a standard lamp having an incandescing filament, a source of current and variable resistance in circuit with said filament, a galvanometer whose deflection depends upon the strength of current through said filament, an auxiliary circuit comprising a source of current connected in opposition to said first named source of current and a resistance, and a scale for said galvanometer calibrated in temperature units and having for zero deflection a reading corresponding with a temperature of visible incandescence.

18. Optical pyrometric apparatus comprising a standard lamp having an incandescing filament of positive temperature coefficient, a source of current and variable resistance in circuit therewith, a galvanometer connected in a shunt to said filament, a circuit connected in a shunt relation with said galvanometer comprising a source of current connected in opposition to said first named source and a resistance, and a scale for said galvanometer calibrated in temperature units and having for zero deflection of said galvanometer a reading corresponding with a temperature of visible incandescence.

In testimony whereof I have hereunto affixed my signature this 28th day of October, 1919.

EARL A. KEELER.